United States Patent Office 3,011,863
Patented Dec. 5, 1961

3,011,863
PHOSPHATE-CYANIDE CORROSION INHIBITING COMPOSITION AND METHOD WITH CHELATING AGENT
Theodore R. Newman, Oak Lawn, Ill., assignor to Nalco Chemical Company, a corporation of Delaware
No Drawing. Filed May 13, 1958, Ser. No. 734,827
21 Claims. (Cl. 21—2.7)

This invention relates to new and improved corrosion inhibiting compositions and to a new and improved method of inhibiting corrosion. The invention is particularly concerned with corrosion inhibiting compositions for preventing or inhibiting underwater corrosion in systems where water is moving, as through condensers, engine jackets, spray or cooling towers, and distribution systems. The invention is especially valuable in inhibiting corrosion of ferrous metals, including iron and steel.

It is known that various phosphates will inhibit underwater corrosion on ferrous metals under certain conditions. The dosage of the phosphate will vary depending upon such factors as the velocity of the water, the temperature and the chemical content of the water. Some phosphates are more effective than others in certain types of waters. Thus, if the water contains very much calcium the use of an orthophosphate is undesirable because the calcium phosphate scale is deposited in the pipes and tubes, thereby producing a result which may be worse than the corrosion. The corroding tendency of the water is greatly increased by the presence of sodium chloride and sodium sulfate. As the velocity of the water increases the dosage of phosphate required to inhibit corrosion normally decreases, and as the temperature of the water is increased the dosage of phosphate to inhibit corrosion also increases.

A major advance in the use of polyphosphates in the inhibition of corrosion in heat interchangers wherein the water is circulated for cooling purposes came with the development of a "synergized cyanide-phosphate treatment" as, for example, that described in Ryznar et al. Reissue Patent U.S. 23,740 of November 17, 1953. The synergized treatment therein described involved the addition of a small amount of a cyanide to a polyphosphate combination and resulted in a marked lowering in corrosion rates as well as in the quantitative level of phosphate treatment necessary to obtain corrosion inhibition. The benefit thereby obtained lay in a substantial increase in the protection against corrosion and in the lowering of the phosphate level essential. Lowering of the phosphate level minimizes the danger of deposition of calcium phosphate sludge due to polyphosphate reversion and lack of pH control.

Additionally, it has now been found that incorporation of relatively small but critical amounts of chelating agents with the synergized cyanide-phosphate treatment of water further enhances the protection of metals against corrosion. The reasons for the improvement in corrosion inhibition by use of the combination is not understood. However, it is known from experimental results obtained that the amounts of added chelating agent in the water treatment in the cyanide-phosphate combination are critical and that the results are less advantageous above about 10 p.p.m. and above 15 p.p.m. are actually disadvantageous and increase rather than decrease the corrosion rate experienced under carefully controlled laboratory testing conditions.

Chelating agents useful for the purposes of this invention may be classified broadly as amino carboxylates and among the amino carboxylates preferred are those which contain more than one amino group, namely, the polyamino carboxylates. Perhaps the most useful and readily available commercial class of chelating agents are the derivatives of ethylene diamine tetraacetic acid. The chelating agents in present day use are illustrated but not exhaustively so by the following individual species. These illustrative species include ethylene diamine tetraacetic acid, N-hydroxyethyl ethylene diamine triacetic acid, N,N-di(2-hydroxyethyl) glycine, nitrilotriacetic acid, diethylene triamine pentaacetic acid, 1,2-diaminocyclohexane tetraacetic acid. Operative chelating agents may be produced from the parent acids listed above by neutralization of one or all of the active hydrogens with a metal. The most usual metals are those which provide water solubility and the first order of importance would be ammonia and the alkali metal group. It is also known to use other metals; lead, for example; to replace one or more of the active hydrogen atoms in the complex polyamino carboxylate chelating agent. The term "chelating agent" and the illustrated members of the class as set out above make it clear that the action of the combination herein described is related to the chelating potential of the chelating agent rather than to any particular chemical class or subclass of chelating agent.

It is somewhat surprising to find that chelating agents are useful in prevention of corrosion inasmuch as initial tests using chelating agents alone in quantities up to about 500 p.p.m. actually show an acceleration of corrosion rather than a diminution or inhibition of corrosion. As chelating agents are known to be useful in metal cleaning and the removal of scale, it is somewhat surprising to find that they are assistants, within a critical range of concentration, in inhibiting corrosion. As they tend to remove scale and rust, it might be presumed that they would tend to promote corrosion, which, in fact, they do as noted above when more than 15 p.p.m. are employed in water treatment.

Broadly, the compositions of this invention comprise a water-soluble phosphate, a water-soluble complex cyanide and a chelating agent wherein the weight ratio of the cyanide groups and the phosphate groups are within critical ranges and the amount of chelating agent is such that when the composition is dissolved in water for inhibition purposes, the quantity of chelating agent does not exceed about 15 p.p.m. The quantity of phosphate ion is in the range of 1 to about 54 p.p.m. and the cyanide ion concentration within the range of about 0.4 to 8.5 p.p.m.

The principal object of this invention is to provide new and improved corrosion inhibiting compositions.

A further object of this invention is to provide new and improved corrosion inhibiting compositions which are effective in preventing or retarding corrosive effects of cooling waters on ferrous metals under a variety of temperature conditions.

A further object of this invention is to provide a new and improved method for increasing the corrosion inhibition of treated cooling waters.

A still further object of the invention is to provide a synergistic chemical composition useful in treating cooling waters containing phosphate ions, cyanide ions and their complexes, and metal chelating agents within a relatively narrow quantitative range when in use as an additive in water treatment to inhibit corrosion.

Still another object is to provide a new and improved method of inhibiting corrosion of ferrous metals in heat exchange interchangers wherein circulating water provides the heat exchange medium at temperatures of 150° F. and above.

Other objects will appear as the invention is more fully described.

The improved corrosion inhibitor compositions of this invention are prepared simply by intimately mixing or blending a corrosion inhibiting phosphate with a compound containing a cyanide group, preferably a complex inorganic cyanide, and a water-soluble chelating agent in a carefully controlled amount. Other additives are not precluded and may include tabletting or briquetting binders, algicides, bactericides and/or other water treating chemicals known to the art. Especially favorable results have been obtained with intimate mixtures of supercooled glassy septaphosphate, tetrasodiumphosphate, sodium ferrocyanide, and the alkali metal salts of ethylene diamine tetraacetic acid. Other useful phosphates include the orthophosphates (e.g., $NaH_2PO_4$, $Na_2HPO_4$, $Na_3PO_4$, and the like). Other polyphosphates are also useful and may be used singularly or in combination.

Polyphosphates are used as corrosion inhibitors in cooling water systems in preference to orthophosphates because of (a) superior corrosion inhibition, (b) stabilization characteristics which tend to minimize deposition of calcium carbonate scale, and (c) a lesser tendency towards the deposition of calcium phosphate sludge. Polyphosphates, however, undergo reversion with time, resulting in the formation of appreciable amounts of orthophosphate mixed in with the polyphosphates.

When in solution in the treated water the amount of the chelating agent is relatively critical in amount, and above about 10 p.p.m. advantages begin to decrease relatively rapidly. Above 15 p.p.m., the usefulness of the combination of components herein described is lost and corrosion begins to increase in rate rather than to decrease. Acceleration of corrosion rate over that of synergized cyanide-phosphate water treating compositions has been observed with some added chelating agents at about 15 p.p.m.

In order to evaluate and illustrate the invention, two basic testing techniques were used. The first was a simple screening test of more or less qualitative nature. This test procedure consisted in rotating a solid metal cylinder at a constant speed for 24 hours in a synthetic water containing the usual contaminants found in coolant waters to which the chemical inhibitor composition to be tested had been added. At the end of the test period the specimen tested was evaluated visually for surface deterioration. This initial screening test provided a rapid method of determining significant differences in the behaviour of corrosion inhibitors to be evaluated. The initial testing procedure is described as follows:

ROTATING ROD TEST

The test specimens used are mild steel rods (SAE 1010) one-quarter inch in diameter and three inches long. In preparing the rods for the test they are abraded with emery paper of decreasing coarseness down to 2/0 (Norton Abrasives) while rotating in the chuck of a motor. The rods should be free of any visible scratches or lines when ready for use. Immediately before immersing the rods in the test water they are again abraded with 2/0 emery paper and then thoroughly cleaned by similar treatment with filter paper.

The test solution is prepared in a 600 ml. beaker. 500 ml. of the test water is used. The treatment is added (generally from a stock solution) and the pH adjusted to 7.0 with $H_2SO_4$ or NaOH. The test water is one prepared to simulate a typical cooling water. This synthetic water has the following composition (herein identified as NT water):

|  | P.p.m. |
|---|---|
| Total hardness (as $CaCO_3$) | 400 |
| Calcium hardness (as $CaCO_3$) | 250 |
| Magnesium hardness (as $CaCO_3$) | 150 |
| Total alkalinity (as $CaCO_3$) | 5 |
| Sulfate (as $Na_2SO_4$) | 1,400 |
| Chloride (as NaCl) | 500 |

The test rod is immersed and rotated in the test solution for 24 hours. The test is run at room temperature which is about 75° F. At the end of this time the rod is removed from the water and air dried. The rod is then examined for coatings, deposits, local attack, general attack, etc., and scored as follows:

Specimen condition

|  | None | Slight | Moderate | Bad | Very Bad |
|---|---|---|---|---|---|
| Discoloration | 10 | 6 | 4 | 0 |  |
| General corrosion | 20 | 15 | 10 | 5 | 0 |
| Local corrosion | 40 | 25 | 10 | 0 |  |
| Roughening | 10 | 6 | 4 | 0 |  |

Condition of liquid

Cloudiness—None 4, slight 3, moderate 2, bad 0
Precipitate—None 8, slight 5, moderate 2, bad 0
General appearance—Good 8, fair 6, poor 4, bad 2, very bad 0

The second testing procedure is more quantitative in nature and involves measurement of corrosion rates of metallic coupons. These coupons were subjected to certain specific sets of test conditions designed so as to approximate those found in field operation which contribute to the corrosion. While it was obviously necessary to make some adjustments for small scale laboratory testing, a strong effort was made to incorporate those variables which are the major factors in causing corrosion in heat exchanger systems associated with cooling towers. The principal corrosive factors operating on the coupons were:

High dissolved oxygen level
High chlorides, sulfates and total dissolved solids
Low alkalinity, low pH (6–6.5)

The procedure was as follows:

MULTI-PURPOSE CORROSION TEST

This test combines the advantages of both the "batch" type test and the "once through" test and is essentially an intermittent, once through test. With this system, conditions are maintained constant throughout the test while a relatively small volume of water is used.

The equipment consists of a series of individual units. Each unit is complete and independent of the others. It consists of two connected five gallon bottles that form the reservoirs for the test water. The water flows from the reservoir by gravity to a float valve assembly that controls the head level. From there the water passes through a solenoid valve that is activated by an electrical timer. The timer opens the valve every five minutes to allow 35 ml. of water to flow into the test vessel that is partially immersed in a constant temperature oil bath at 150° F. The rate of flow is about 10 liters per day, corresponding to a fourfold replacement of the water daily. The water leaves the test vessel through an overflow tube. The control water used in this test has the same composition as the one used in the "rotating rod test" described as NT water.

The test specimens are made of No. 20 gauge SAE 1010 mild steel, and are one inch wide and two inches long. They are suspended in the test vessel from a 3/16" hole drilled one-quarter inch from the short edge. The panels are prepared by sandblasting with "Flint Shot" sand. After sandblasting they are cleaned first in toluene and then acetone, and weighed and placed in the test vessel. They are then suspended from glass hooks in the test vessel. After the test, they are removed and then cleaned by a 30 sec. immersion in muriatic acid inhibited with formaldehyde. They are then removed from the acid and neutralized in a soda ash solution. The panels are then rinsed in water, dipped in acetone and air dried. Test panels are stored in a heated cabinet at 105° F. before weighing.

The test vessel is a Pyrex jar six inches in diameter and eight inches tall, with an overflow tube at a point two inches from the top. The vessel is covered by a stainless steel lid that has a hole in the center to accommodate the stirrer, and holes around the edge for mounting the glass hook holders. The stirrer has a 1″ x 2″ paddle and rotates at 175 r.p.m. There are also holes in the lid to admit the tube from the reservoirs, and an aerator. The tests are aerated continuously.

These tests can be run for any length of time desired. Six metal test coupons can be mounted in each test vessel. One is removed periodically to determine if the corrosion rates have leveled off. During the first few days of a test run the corrosion rates are relatively high and tend to be less reproducible, and for this reason it is necessary to run the test longer. The corrosion rates generally level off in between three and seven days. The initial corrosion rate for the system with no inhibitor present is about 80 m.p.y. (mils per year). After an exposure of 15 days, the rate will reach equilibrium at about 50 m.p.y.

While a standard NT water was used in the tests hereinafter described, variations covering the whole range of cooling waters usually available over the country-side were checked with results similar to those obtained with the standard NT water.

The invention will be further illustrated but is not limited by the following examples in which the quantities are stated in parts by weight unless otherwise indicated.

EXAMPLE I

| | |
|---|---|
| Sodium ferrocyanide | 24 |
| Tetrasodiumpyrophosphate | 36 |
| Sodium sulfite | 8 |
| Supercooled septaphosphate | 32 |

The above ingredients were intimately mixed and dry ground and used as a source of a standard or stock agent for test purposes as indicated in the following examples.

EXAMPLE II

| | Parts |
|---|---|
| Soda ash | 6 |
| Supercooled septaphosphate | 40 |
| Tetrasodiumpyrophosphate anhydrous | 46 |
| Sodium ferrocyanide | 8 |

The ingredients described were weighed out, intimately mixed and ground and used as a stock preparation in the examples which follow.

EXAMPLE III 100 parts of Example II and 33 parts of the disodium lead salt of ethylene diamine tetraacetic acid were combined.

EXAMPLE IV 100 parts of Example II and 33 parts of ethylene diamine tetraacetic acid were mixed together for test purposes.

EXAMPLE V 100 parts of Example II and 33 parts of disodium salt of ethylene diamine tetraacetic acid were combined.

EXAMPLE VI 100 parts of Example II and 33 parts of trisodium salt of ethylene diamine tetraacetic acid were combined for test.

EXAMPLE VII 100 parts of Example II and 33 parts of tetrasodium salt of ethylene diamine tetraacetic acid were intimately mixed.

EXAMPLE VIII 85 parts of Example II and 15 parts of trisodium salt of N-hydroxyethyl ethylene diamine triacetic acid were incorporated together for test of the combination.

EXAMPLE IX 90 parts of Example II and 10 parts of the chelating agent of Example VIII were prepared for test.

EXAMPLE X 95.8 parts of Example II and 4.2 parts of the chelating agent of Example VIII were prepared for test.

EXAMPLE XI 97.8 parts of Example II and 2.2 parts of the chelating agent of Example VIII were carefully blended for test purposes.

EXAMPLE XII 92.3 parts of Example I and 7.7 parts of the chelating agent of Example VIII were blended together for test.

EXAMPLE XIII 85.7 parts of Example I and 14.3 parts of the chelating agent of Example VIII were combined together for test purposes.

EXAMPLE XIV 80 parts of Example II and 20 parts of the chelating agent of Example VIII were intermixed for evaluation as a corrosion inhibiting combination.

EXAMPLE XV 100 parts of Example II and 33 parts of monosodium salt of N,N-di(2-hydroxyethyl) glycine were intermixed for evaluation as a corrosion inhibiting combination.

EXAMPLE XVI

Technical grade disodium lead salt of ethylene diamine tetraacetic acid was set aside and identified for test, per se, as a corrosion inhibitor.

EXAMPLE XVII

Technical grade trisodium salt of N-hydroxyethyl ethylene diamine triacetic acid was identified as Example XVII for evaluation as a corrosion inhibitor.

EXAMPLE XVIII

Aliquot portions of the NT water previously described were treated with the compositions described in Examples I through VII in such quantities as to provide 30 parts per million of the composition of Examples I and II in all cases and 10 parts per million of the chelating agent and 30 parts per million of the composition of Examples I and II as used in Examples III through VII.

The so prepared inhibited corrosive waters were subjected to evaluation in the rotating rod test, as described. The tests are identified with the parent example in the following manner:

Example I is identified as 1 std., meaning Example I composition at the level indicated, as standard for comparison; Example II standard is interpreted similarly; Example III E; Example IV E; Example V E; Example VI E; Example VII E; are to be interpreted as Example III composition, evaluated (E) in test use in corrosive water, etc. Thus, Example III E is the evaluation of Example III. After completing comparative tests, the test results obtained were tabulated as follows:

*Table I*

| Test | Remarks | Corrosion Score |
|---|---|---|
| Ex. I std | No chelating agent | 86 |
| Ex. II std | ----do---- | 86 |
| Ex. III E | Disodium lead salt of E.D.T.A.[1] | 97 |
| Ex. IV E | E.D.T.A.[1] | 90 |
| Ex. V E | Disodium salt of E.D.T.A.[1] | 90 |
| Ex. VI E | Trisodium salt of E.D.T.A.[1] | 90 |
| Ex. VII E | Tetrasodium salt of E.D.T.A.[1] | 89 |
| Ex. XVI E | 1,000 p.p.m. of Example XVI chelate agent | Bad |
| Ex. XVII E | 1,000 p.p.m. of Example XVII chelate agent | Bad |

[1] Ethylene diamine tetraacetic acid.

EXAMPLE XIX

Test waters were made up the prepared standard NT water additionally treated with the compositions as described in Examples VIII through XIV at various levels of concentration as hereinafter identified. The test waters were then used in the Multi-Purpose Corrosion Test Apparatus (see also "Corrosion," November 1948, and the article entitled "A Simple Test Method for Evaluating Corrosion Inhibitors," by Ryznar and Green). The sample identification and the data obtained are recorded in Table II.

Table II

| Example | P.p.m. | P.p.m. PO₄ | P.p.m. Chelate | Days Exposed (Corrosion Rate in mils per year) | | | | | | | |
|---|---|---|---|---|---|---|---|---|---|---|---|
| | | | | 3 | 4 | 6 | 7 | 8 | 9 | 10 | 15 |
| VIII E | 70 | 40 | 10 | 2.4 | | | 1.9 | | | | |
| Std. II E | 45 | 30 | | 11.0 | | | 7.6 | | 6.0 | | |
| IX E | 50 | 30 | 5 | 10.0 | | | 6.7 | | 4.9 | | |
| X E | 47 | 30 | 2 | 12.4 | | | 7.3 | | 5.4 | | |
| XI E | 46 | 30 | 1 | 11.3 | | | 7.4 | | 5.6 | | |
| XIV E | 55 | 30 | 10 | | 7.6 | | | 6.0 | | | |
| Std. I E | 59.7 | 30 | | 11.5 | | 6.2 | | | | 4.8 | 4.3 |
| XII E | 64.7 | 30 | 5 | 8.7 | | 5.3 | | | | 3.5 | 1.9 |
| XIII E | 69.7 | 30 | 10 | 5.9 | | 4.3 | | | | 3.3 | 2.7 |

EXAMPLE XX

A compressed ball of a standard weight and dimension was prepared containing the following ingredients in the quantities noted:

50 parts by weight of glassy septaphosphate
7 parts by weight of sodium ferrocyanide
27 parts by weight of anhydrous tetrasodium pyrophosphate
8 parts by weight of lignosulfite binder
10 parts by weight of trisodium salt of hydroxyethyl ethylene diamine triacetic acid
8 parts of water The above composition, after briquetting, is suitable for mechanically measured addition in water treatment wherein a ball-feeder is employed.

In the commercial practice of this invention, it is obvious that ethylene diamine tetraacetic acid may be used and sufficient alkali added in addition to form the various alkali metal salts. Selection of the particular form of ethylene diamine tetraacetic acid to be used for the purposes of this invention is more a question of economics and convenience rather than the selection of any particular metal, alkali metal or ammonia salt as indications are that the nature of the metal salt is not particularly critical in obtaining the synergistic result of the combination disclosed. At the levels of interest, solubility does not appear to be a factor.

From experience with a considerable number of laboratory runs of the nature of those hereinbefore set out, it has been determined that compositions giving rise to treated waters effective and synergistic in combination to inhibit corrosion contain from 1.1 to 54 p.p.m. of phosphate as PO₄; 0.4 to 8.5 p.p.m. of cyanide as CN; and from 1 to not more than 15 p.p.m. of chelating agent but preferably from 2 to not more than 12 parts are most useful. As will be observed in the examples, metals other than the alkali metals can be employed to form the salts of the polyamino carboxylic acids herein described without apparent deleterious effect upon the combination. For example, a lead salt appears to be equally useful to the alkali metal salts. Experimental survey of other metal ions substituted for the alkali metals do not seem to interfere with the results obtained. Not all metal ions have been actually subjected to test but a representative number of commonly available metallic ions which have been surveyed indicate that the presence or absence of these ions in combination with the chelating agent does not materially interfere with the improved corrosion inhibition obtained by the combination of the phosphate-cyanide-chelating agent combination of this invention. In the corrosion inhibiting compositions to be added to the corrosive aqueous fluids to be inhibited, the range of weight ratios of cyanide to phosphate are of the order of 0.005 to 0.33 and preferably about 0.09 to 0.20.

The foregoing description and examples set out a preferred method of the practice of this invention both in the method of inhibiting corrosion in circulating cooling waters where temperatures of the order of 150° F., which ordinarily accelerate corrosion rate, can be brought under control, and describe new compositions of matter in which combination each component appears to act in concert to aid corrosion inhibition. In the novel combinations described, less total additive accomplishes the same end as heretofore has been accomplished by way of corrosion inhibition with larger quantities in p.p.m. of cyanide-phosphate combinations alone. From a practical standpoint, equal or better corrosion inhibition is available through use of the present combination of components as herein described but in smaller quantity than has been heretofore necessary or thought practical.

Having thus described the invention, I claim:

1. A corrosion inhibiting composition comprising a water-soluble phosphate, a water-soluble inorganic complex cyanide, and an amino carboxylate chelating agent wherein the weight ratio of the cyanide group of said cyanide ion to the phosphate group of said phosphate ion is from 0.005 to 0.33, and said composition when dissolved in water providing a phosphate ion concentration within a range of 1.1 to 54 p.p.m., a cyanide ion concentration within a range of 0.4 to 8.5 p.p.m., and said chelating agent in a concentration within a range of from 1 to not more than 15 p.p.m. of the water so-treated.

2. A corrosion inhibiting composition comprising essentially a water-soluble glassy polyphosphate, a water-soluble inorganic complex cyanide, and an amino carboxylate metal chelating agent wherein the weight ratio of the cyanide group of said cyanide ion to the phosphate group of said phosphate ion is from 0.005 to 0.33, and said composition when dissolved in water providing a phosphate ion concentration within a range of 1.1 to 54 p.p.m., a cyanide ion concentration within a range of 0.4 to 8.5 p.p.m., and said metal chelating agent a concentration from 1 to less than 15 p.p.m. of the water so-treated.

3. A corrosion inhibiting composition comprising essentially a water-soluble molecularly dehydrated phosphate, an alkali metal ferrocyanide, and an amino carboxylate metal chelating agent wherein the weight ratio of the cyanide group of said cyanide with the phosphate group of said phosphate is from 0.005 to 0.33 and said composition when dissolved in water providing a phosphate ion concentration within a range of 1.1 to 54 p.p.m., a cyanide concentration within a range of 0.4 to 8.5 p.p.m., and said amino carboxylate metal chelating agent within a range of from about 2 to 12 p.p.m. of the water so-treated.

4. A corrosion inhibiting composition comprising essentially a water-soluble molecularly dehydrated phosphate, a water-soluble inorganic complex cyanide, and a polyamino carboxylate metal chelating agent wherein the weight ratio of the cyanide group of said cyanide with the phosphate group of said phosphate is from 0.005 to 0.33, and said composition when dissolved in water providing a phosphate ion concentration within a range of 1.1 to 54 p.p.m., a cyanide concentration within a range of 0.4 to 8.5 p.p.m., and said polyamino carboxylate metal chelating agent within a range of from about 2 to 12 p.p.m. of the water so-treated.

5. The product of claim 3 wherein the amino carboxylate is a metal salt of N.N-di(2-hydroxyethyl) glycine.

6. The product of claim 4 wherein the polyamino carboxylate is a metal salt of ethylene diamine polyacetic acid.

7. The product of claim 4 wherein the polyamino carboxylate is a metal salt of ethylene diamine tetraacetic acid.

8. The product of claim 4 wherein the polyamino carboxylate chelating agent is a metal salt of N-hydroxyethyl ethylene diamine triacetic acid.

9. The product of claim 4 wherein the polyamino carboxylate is the trisodium salt of N-hydroxyethyl ethylene diamine tetraacetic acid.

10. The product of claim 4 wherein the polyamino carboxylate chelating agent is a sodium salt of ethylene diamine tetraacetic acid.

11. The product of claim 4 wherein the polyamino carboxylate metal chelating agent is tetrasodium ethylene diamine tetraacetic acid.

12. A method of inhibiting corrosion of metals in contact with water which comprises incorporating with the water (1) a water-soluble phosphate, (2) a water-soluble inorganic complex cyanide, and (3) an amino carboxylate metal chelating agent; the quantity of the phosphate ion from said phosphate in said water being within a range of 1.1 to 54 p.p.m.; the quantity of cyanide ion from said inorganic cyanide being within a range of 0.4 to 8.5 p.p.m.; and said metal chelating agent being within a range of 1 to less than 15 p.p.m. of the water so-treated.

13. A method of inhibiting corrosion of metals in water at temperatures above about 150° F., which comprises incorporating with the water (1) a water-soluble polyphosphate, (2) a water-soluble alkali metal ferrocyanide, and (3) an amino carboxylate chelating agent; the quantity of phosphate ion from said polyphosphate being within a range of 1.1 to 54 p.p.m.; the quantity of cyanide ion from said alkali metal ferrocyanide being within a range of 0.4 to 8.5 p.p.m.; and the quantity of the amino carboxylate chelating agent being within a range of from 1 to less than 15 p.p.m.; and the weight ratio of said cyanide ion to said phosphate ion being within a range of 0.005 to 0.33.

14. The method of claim 10 wherein the amino carboxylate chelating agent is the monosodium salt of N.N-di(2-hydroxyethyl) glycine.

15. The method of claim 13 wherein the amino carboxylate chelating agent is a metal salt of ethylene diamine tetraacetic acid.

16. The method of claim 13 wherein the amino carboxylate chelating agent is tetrasodium ethylene diamine tetraacetic acid.

17. The method of claim 13 wherein the amino carboxylate chelating agent is a metal salt of N-hydroxyethyl ethylene diamine triacetic acid.

18. A method of inhibiting corrosion in water which is in contact with ferrous metals at temperatures above about 150° F. which comprises incorporating in said water so that all ions of the components are present at the same time (1) a super-cooled, glassy septaphosphate, (2) sodium ferrocyanide, and (3) a metal salt of ethylene diamine polyacetic acid so that the resultant water contains dissolved therein from 20 to 40 p.p.m. of phosphate ion, 2.8 to 7.8 p.p.m. of cyanide ion, and from about 2 to 12 p.p.m. of said metal chelating agent.

19. A water treating composition comprising a water-soluble phosphate, a water-soluble inorganic complex cyanide, and N-hydroxyethyl ethylene diamine triacetic acid as a chelating agent wherein the weight ratio of the cyanide group of said cyanide ion to the phosphate group of said phosphate ion is from 0.005 to 0.33, and said composition when dissolved in water providing a phosphate ion concentration within a range of 1.1 to 54 p.p.m., a cyanide ion concentration within a range of 0.4 to 8.5 p.p.m., and said chelating agent in a concentration within a range of from 1 to not more than 15 p.p.m. of the water so-treated.

20. A water treating composition comprising a water-soluble phosphate, water-soluble inorganic complex cyanide, and a metal salt of N-hydroxyethyl ethylene diamine triacetic acid as a chelating agent wherein the weight ratio of the cyanide group of said cyanide ion to the phosphate group of said phosphate ion is from 0.005 to 0.33, and said composition when dissolved in water providing a phosphate ion concentration within a range of 1.1 to 54 p.p.m., a cyanide ion concentration within a range of 0.4 to 8.5 p.p.m., and said chelating agent in a concentration within a range of from 1 to not more than 15 p.p.m. of the water so-treated.

21. A water treating composition comprising essentially a water-soluble molecularly dehydrated phosphate, a water-soluble inorganic complex cyanide, and N-hydroxyethyl ethylene diamine triacetic acid as a chelating agent wherein the weight ratio of the cyanide group of said cyanide with the phosphate group of said phosphate is from 0.005 to 0.33, and said composition when dissolved in water providing a phosphate ion concentration within a range of 1.1 to 54 p.p.m., a cyanide concentration within a range of 0.4 to 8.5 p.p.m., and said polyamino carboxylate metal chelating agent within a range of from about 2 to 12 p.p.m. of the water so-treated.

References Cited in the file of this patent

UNITED STATES PATENTS

| | | |
|---|---|---|
| Re. 23,740 | Ryznar et al. | Nov. 17, 1953 |
| 2,506,492 | Mytt et al. | May 2, 1950 |
| 2,560,839 | Ayo et al. | July 17, 1951 |
| 2,680,094 | Bartlett et al. | June 1, 1954 |
| 2,786,033 | Gottshall | Mar. 19, 1957 |

OTHER REFERENCES

"Sequestrene," Geigy, Industrial Chemicals, 1952, pp. 36, 50.